United States Patent
Bapat et al.

(10) Patent No.: US 10,410,372 B1
(45) Date of Patent: Sep. 10, 2019

(54) METHODS, SYSTEMS, AND COMPUTER-READABLE MEDIA FOR UTILIZING RADIAL DISTORTION TO ESTIMATE A POSE CONFIGURATION

(71) Applicant: The University of North Carolina at Chapel Hill, Chapel Hill, NC (US)

(72) Inventors: Akash Abhijit Bapat, Chapel Hill, NC (US); James True Price, Chapel Hill, NC (US); Jan-Michael Frahm, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 16/008,682

(22) Filed: Jun. 14, 2018

(51) Int. Cl.
*G06T 7/73* (2017.01)
*H04N 5/247* (2006.01)
*G06T 3/00* (2006.01)
*G06T 7/246* (2017.01)
*G06T 7/292* (2017.01)

(52) U.S. Cl.
CPC ............. *G06T 7/74* (2017.01); *G06T 3/0093* (2013.01); *G06T 7/248* (2017.01); *G06T 7/292* (2017.01); *H04N 5/247* (2013.01)

(58) Field of Classification Search
CPC ....................................................... G06T 7/74
See application file for complete search history.

(56) References Cited

U.S. PATENT DOCUMENTS

| | | |
|---|---|---|
| 6,503,195 B1 | 1/2003 | Keller et al. |
| 7,453,514 B2 | 11/2008 | Furlan et al. |
| 8,617,058 B2 * | 12/2013 | Arneson ............ A61B 1/00041 600/160 |
| 9,898,866 B2 | 2/2018 | Fuchs et al. |
| 10,074,031 B2 * | 9/2018 | Krenzer ............. G06K 9/00335 |
| 2002/0118861 A1 | 8/2002 | Jouppi et al. |

(Continued)

FOREIGN PATENT DOCUMENTS

| | | |
|---|---|---|
| KR | 10-2005-0082348 | 8/2005 |
| KR | 10-2009-0047889 | 5/2009 |

(Continued)

OTHER PUBLICATIONS

Geyer et al., "Geometric Models of Rolling-Shutter Cameras," EECS Department, University of California, Berkeley, pp. 1-8 (publication date unknown).

(Continued)

*Primary Examiner* — James M Pontius
(74) *Attorney, Agent, or Firm* — Jenkins, Wilson, Taylor & Hunt P.A.

(57) ABSTRACT

Methods, systems, and computer-readable media for utilizing radial distortion to estimate a pose configuration are disclosed. According to one aspect, the method includes receiving, from each of a plurality of camera devices, an input pixel row of a radially distorted image and conducting a row comparison between each of the input pixel rows and a respectively associated synthesized pixel row. The method further includes approximating, for each row comparison, a span of a curve in an image space with a plurality of segments and computing, for each of the plurality of segments, a constraint. The method also includes utilizing the constraints to estimate a pose configuration.

20 Claims, 7 Drawing Sheets

(56) References Cited

U.S. PATENT DOCUMENTS

| | | | |
|---|---|---|---|
| 2005/0083248 | A1 | 4/2005 | Biocca et al. |
| 2005/0168403 | A1 | 8/2005 | Ebersole, Jr. et al. |
| 2006/0161572 | A1 | 7/2006 | Vogt et al. |
| 2009/0185715 | A1* | 7/2009 | Hofhauser .......... G06K 9/6206 382/103 |
| 2009/0213037 | A1 | 8/2009 | Schon |
| 2010/0053325 | A1* | 3/2010 | Inagaki ................ G06T 3/0062 348/143 |
| 2010/0253859 | A1 | 10/2010 | Hall, Jr. |
| 2011/0018903 | A1 | 1/2011 | Lapstun et al. |
| 2011/0211082 | A1 | 9/2011 | Forssén et al. |
| 2012/0062702 | A1 | 3/2012 | Jiang et al. |
| 2012/0093365 | A1* | 4/2012 | Aragane ................ H04N 7/15 382/103 |
| 2012/0098926 | A1* | 4/2012 | Kweon .................... G06T 1/00 348/36 |
| 2012/0105473 | A1 | 5/2012 | Bar-Zeev et al. |
| 2012/0113092 | A1 | 5/2012 | Bar-Zeev et al. |
| 2012/0119978 | A1 | 5/2012 | Border et al. |
| 2012/0192088 | A1 | 7/2012 | Sauriol et al. |
| 2012/0307075 | A1 | 12/2012 | Margalit |
| 2012/0320224 | A1 | 12/2012 | Miyoshi et al. |
| 2013/0201291 | A1 | 8/2013 | Liu et al. |
| 2014/0118496 | A1* | 5/2014 | Calakli ................ H04N 13/254 348/46 |
| 2015/0138069 | A1 | 5/2015 | Fuchs et al. |
| 2015/0369609 | A1* | 12/2015 | Roumeliotis ........ G01C 21/165 701/532 |
| 2016/0035139 | A1 | 2/2016 | Fuchs et al. |
| 2017/0018086 | A1* | 1/2017 | Zhang .................... H04N 5/232 |
| 2017/0026599 | A1* | 1/2017 | He ...................... G02B 27/0025 |
| 2017/0032214 | A1* | 2/2017 | Krenzer ............. G06K 9/00335 |
| 2017/0345398 | A1 | 11/2017 | Fuchs et al. |
| 2018/0053284 | A1* | 2/2018 | Rodriguez .............. G06T 5/006 |
| 2018/0054575 | A1* | 2/2018 | Pawlowicz ........ G01N 23/2251 |
| 2018/0068462 | A1* | 3/2018 | Wakai ................. G01B 21/042 |
| 2018/0157946 | A1* | 6/2018 | Landry ............ G06K 19/06037 |
| 2018/0173963 | A1* | 6/2018 | Taylor ................ G06K 9/00771 |
| 2019/0096043 | A1* | 3/2019 | Ma .......................... G06T 5/006 |

FOREIGN PATENT DOCUMENTS

| | | | |
|---|---|---|---|
| WO | WO 2004/012141 A1 | 2/2004 | |
| WO | WO 2013/173728 A1 | 11/2013 | |
| WO | WO 2014/160342 A1 | 10/2014 | |
| WO | WO 2016/073557 A1 | 5/2016 | |

OTHER PUBLICATIONS

Albl et al., "Degeneracies in Rolling Shutter SFM," European Conference on Computer Vision, pp. 36-51 (2016).

Bapat et al., "Towards Kilo-Hertz 6-DOF Visual Tracking Using an Egocentric Cluster of Rolling Shutter Cameras," IEEE Transactions on Visualization and Computer Graphics, vol. 22, No. 11, pp. 2358-2367 (2016).

Dai et al., "Rolling Shutter Camera Relative Pose: Generalized Epipolar Geometry," The IEEE Conference on Computer Vision and Pattern Recognition (CVPR), pp. 1-11 (2016).

Kim et al., "Direct Semi-Dense Slam for Rolling Shutter Cameras," School of Computer Science University of Adelaide, Australia, pp. 1-8 (2016).

Lincoln et al., "From Motion to Photons in 80 Microseconds: Toward Minimal Latency for Virtual and Augmented Reality," IEEE Transactions on Visualization and Computer Graphics, vol. 22, No. 4, pp. 1367-1376 (2016).

Saurer et al., "Sparse to Dense 3d Reconstruction from Rolling Shutter Images," IEEE Computer Vision and Pattern Recognition, pp. 1-9 (2016).

Kerl et al., "Dense Continuous-Time Tracking and Mapping with Rolling Shutter RGB-D Cameras," Proceedings of the IEEE International Conference on Computer Vision, pp. 2264-2272 (2015).

Saurer et al., "A Minimal Solution to the Rolling Shutter Pose Estmation Problem," Intelligent Robots and Systems (IROS), pp. 1328-1334 (2015).

Engel et al., "LSD-SLAM, General Notes on Good Results," https://github.com/tum-vision/lsd_slam#316-general-notes-for-good-results, pp. 1-7 (2014).

Engel et al., "LSD SLAM: Large-Scale Direct Monocular Slam," European Conference on Computer Vision, Springer, pp. 834-849 (2014).

LaValle et al., "Head Tracking for the Oculus Rift," Robotics and Automation (ICRA), pp. 187-194 (2014).

Saurer et al., "Rolling Shutter Stereo," Proceedings of the IEEE Intl. Conference on Computer Vision, pp. 465-472 (2013).

Dou et al., "Exploring High-Level Plane Primitives for Indoor 3d Reconstruction with a Hand-Held RGB-D Camera," Asian Conference on Computer Vision, Springer, pp. 94-108 (2012).

Grundmann et al., "Effective Calibration Free Shutter Removal," http://www.cc.gatech.edu/cpl/projects/rollingshutter, pp. 1-8 (2012).

Handa et al., "Real-Time Camera Tracking: When is High Frame-Rate Best?" European Conference on Computer Vision, Spring, pp. 222-235 (2012).

Hedborg et al., "Rolling Shutter Bundle Adjustment," Computer Vision and Pattern Recognition (CVPR), pp. 1434-1441 (2012).

Magerand et al., "Global Optimization of Object Pose and Motion from a Single Rolling Shutter Image with Automatic 2d-3d Matching," European Conference on Computer Vision, Springer, pp. 456-469 (2012).

Hedborg et al., "Structure and Motion Estimation from Rolling Shutter Video," Computer Vision Workshops (ICCV Workshops), pp. 17-23 (2011).

Liu et al., "Subspace Video Stabilization," ACM Transactions on Graphics (TOG), vol. 30, No. 1, pp. 1-4 (2011).

Forssen et al., "Rectifying Rolling Shutter Video from Hand-Held Devices," Computer Vision and Pattern Recognition (CVPR), pp. 507-514 (2010).

Bradley et al., "Synchronization and Rolling Shutter Compensation for Consumer Video Camera Arrays," Computer Vision and Pattern Recognition Workshops, 2009. CVPR Workshops 2009. IEEE Computer Society Conference, pp. 1-8 (2009).

Ait-Adler et al., "Kinematics from Lines in a Single Rolling Shutter Image," Computer Vision and Pattern Recognition, 2007, pp. 1-6 (2007).

Sanchez-Vives et al., "From Presence Toward Consciousness," 8th Annual Conference for the Scientific Study of Consciousness, pp. 1-34 (2004).

Zhang, "A Flexible New Technique for Camera Calibration," IEEE Transactions on Pattern Analysis and Machine Intelligence, vol. 22, No. 11, pp. 1330-1334 (2000).

Welch et al., "The Hiball Tracker: High-Performance Wide-Area Tracking for Virtual and Augmented Environments," Proceedings of the ACM Symposium on Virtual Reality Software and Technology, pp. 1-11 (1999).

Brown, "Decentering Distortion of Lenses," Photometric Engineering, vol. 32, No. 3, pp. 444-462 (1966).

Bapat et al., "Rolling Shutter and Radial Distortion are Features for High Frame Rate Multi-Camera Tracking," Department of Computer Science, The University of North Carolina at Chapel Hill, pp. 1-10 (publication date unknown).

Examiner-Initiated Interview Summary for US. Appl. No. 14/401,833 (dated Mar. 9 2018).

Non-Final Office Action for U.S. Appl. No. 14/401,833 (dated Oct. 6, 2017).

Notice of Allowance and Fee(s) Due to Examiner-Initiated Interview Summary for U.S. Appl. No. 14/776,244 (dated Oct. 3, 2017).

Non-Final Office Action for U.S. Appl. No. 14/776,244, (dated May 18, 2017).

Kim et al., "Rrd-Slam: Radial-Distorted Rolling-Shutter Direct Slam," Robotics and Automation (ICRA). pp. 5148-5154 (2017).

Final Office Action for U.S. Appl. No. 14/401,833 (dated May 12, 2017).

Rengarajan et al., "From Bows to Arrows: Rolling Shutter Rectification of Urban Scenes," Proceedings of the IEEE Conference on Computer Vision and Pattern Recognition, pp. 2773-2781 (2016).

(56) References Cited

OTHER PUBLICATIONS

Albl et al., "R6p-Rolling Shutter Absolute Camera Pose," Proceedings of the IEEE Conference on Computer Vision and Pattern Recognition, pp. 2292-2300 (2015).
Patron-Perez et al., "A Spline-Based Trajectory Representation for Sensor Fusion and Rolling Shutter Cameras," International Journal of Computer Vision, vol. 113, No. 3, pp. 208-219 (2015).
Zheng et al., Minimizing Latency for Augmented Reality Displays: Frames Considered Harmful, International Symposium on Mixed and Augmented Reality (ISMAR), pp. 195-200 (2014).
Oth et al., "Rolling Shutter Camera Calibration," Proceedings of the IEEE Conference on Computer Vision and Pattern Recognition, pp. 1360-1367 (2013).
Gelper et al., "Robust Forecasting with Exponential and Holt-Winters Smoothing," Journal of Forecasting. vol. 29, No. 3, pp. 1-22 (2010).
Ait-Aider et al., "Exploiting Rolling Shutter Distortions for Simultaneous Object Pose and Velocity Computation Using a Single View," Computer Vision Systems, 2006 ICVS'06, pp. 1-7 (2006).
"HCC: CGV: Small: Just-in-Time Tracking and Display for Matching Real and Virtual Worlds in Head-Worn Displays," pp. 1-19 (Publication Date Unknown).
Adelstein et al., "Head tracking latency in virtual environments: psychophysics and a model," Proceedings of the Human Factors and Ergonomics Society Annual Meeting, vol. 47, pp. 2083-2087 SAGE Publications, (2003).
Applicant Initiated Interview Summary for U.S. Appl. No. 14/401,833 dated Mar. 17, 2016.
Asteriadis et al., "Head pose estimation with one camera, in uncalibrated environments," Proceedings of the 2010 workshop on Eye gaze in intelligent human machine interaction, EGIHMI '10, pp. 55-62, New York, NY, USA (2010).
Baker et al., "Removing rolling shutter wobble," Computer Vision and Pattern Recognition (CVPR) 2010 IEEE Conference, pp. 2392-2399 (Jun. 2010).
Belhumeur et al., "What is the set of images of an object under all possible illumination conditions?," Int. J. Comput. Vision, vol. 28, No. 3, pp. 1-16 (Jul. 1998).
Tsai et al., "A New Technique for Fully Autonomous and Efficient 3d Robotics Hand/Eye Calibration," IEEE Transactions on Robotics and Automation, vol. 5, No. 3, pp. 345-358 (1989).
Bishop, "Self-Tracker: A Smart Optical Sensor on Silicon," Dissertation, http://www.cs.unc.edu/~gb/Pubs/SelfTracker.pdf, pp. 1-61 (1984).
Caudell et al., "Augmented reality: an application of heads-up display technology to manual manufacturing processes," Proceedings of the Twenty-Fifth Hawaii International Conference on System Sciences, vol. 2, pp. 659-669 (Jan. 1992).
Clipp et al., "Parallel, real-time visual slam," 2010 IEEE/RSJ International Conference on Intelligent Robots and Systems (IROS), pp. 3961-3968, IEEE (2010).
Comaniciu et al., "Mean shift: A robust approach toward feature space analysis," IEEE Trans. Pattern Anal. Mach. Intell., vol. 24, No. 5, pp. 603-619, (May 2002).
Coombe et al., "An incremental weighted least squares approach to surface lights fields," GRAPP International Conference on Computer Graphics Theory and Applications, pp. 84-91, (2006).
Coombe et al., "Online Construction of Surface Light Felds," EGSR, pp. 1-9 (2005).
Coombe et al., "Radiosity on graphics hardware," Proceedings of Graphics Interface, pp. 1-8 (2004).
Coombe, "Practical Surface Light Fields," Phd Dissertation, pp. 1-110 (2007).
Davison et al., "Monoslam: Real-time single camera slam," IEEE Transactions on Pattern Analysis and Machine Intelligence, vol. 29, No. 6, pp. 1052-1067 (2007).
Davison, "Real-time simultaneous localisation and mapping with a single camera," Proceedings of the Ninth IEEE International Conference on Computer Vision, pp. 1403-1410, IEEE, (2003).
Deering et al., "The triangle processor and normal vector shader: a VLSI system for high performance graphics," Proceedings of the 15th annual conference on Computer graphics and interactive techniques, SIGGRAPH '88, pp. 21-30, New York, NY, USA, ACM, (1988).
DLP Discovery 4100 Development Kit, http://www.ti.com/tool/dlpd4x00kit, pp. 1-4 (Jan. 2014).
Dou et al., "Scanning and Tracking Dynamic Objects with Commodity Depth Cameras," Mixed and Augmented Reality (ISMAR), IEEE International Symposium, pp. 1-8 (2013).
Elgammal, "Learning to track: Conceptual manifold map for closed-form tracking," Proceedings of the 2005 IEEE Computer Society Conference on Computer Vision and Pattern Recognition (CVPR'05), vol. 1, CVPR '05, pp. 724-730, Washington, DC, USA, IEEE Computer Society, (2005).
Ellis et al., "Three dimensional tracking in augmented environments: user performance trade-offs between system latency and update rate," Proceedings of the Human Factors and Ergonomics Society annual meeting, vol. 46, pp. 2149-2153, SAGE Publications, (2002).
Feiner et al., "A touring machine: Prototyping 3d mobile augmented reality systems for exploring the urban environment," Proceedings of the 1st IEEE International Symposium on Wearable Computers, ISWC '97, pp. 74-81, Washington, DC, USA, IEEE Computer Society, (1997).
Feiner et al., "Knowledge-based augmented reality," Commun. ACM, vol. 36, No. 7, pp. 53-62, (Jul. 1993).
Final Office Action for U.S. Appl. No. 14/408, 833 (dated Jun. 10, 2016).
Fischler et al., "Random sample consensus: a paradigm for model fitting with applications to image analysis and automated cartography," Commun. ACM, vol. 24, No. 6, pp. 381-395, (Jun. 1981).
Forsse et al., "Rectifying rolling shutter video from hand-held devices," 2010 IEEE Conference on Computer Vision and Pattern Recognition (CVPR), pp. 507-514, (Jun. 2010).
Fossum, "Cmos image sensors: electronic camera on a chip," International Electron Devices Meeting, 1995, IEDM '95, pp. 17-25, (Dec. 1995).
Fuchs et al., "Augmented reality visualization for laparoscopic surgery," Proceedings of the First International Conference on Medical Image Computing and Computer-Assisted Intervention, Springer-Verlag, pp. 1-10 (1998).
Fuchs, "Augmenting Reality for Medicine, Training, Presence, and Telepresence," Proceedings IEEE International Symposium on Mixed and Augmented Reality (ISMAR 2010), 1 page (2010).
Gabbard et al., "User-centered design and evaluation of virtual environments," Computer Graphics and Applications, IEEE, vol. 19, No. 6, pp. 51-59, (1999).
Gu et al., "Coded Rolling Shutter Photography: Flexible Space-Time Sampling," Computational Photography (ICCP), 2010 IEEE International Conference, pp. 1-8 (Mar. 2010).
Hager et al., "Efficient region tracking with parametric models of geometry and illumination," IEEE Transactions on Pattern Analysis and Machine Intelligence, vol. 20, No. 10, pp. 1025-1039, (Oct. 1998).
Hanna, "Direct multi-resolution estimation of ego-motion and structure from motion," Proceedings of the IEEE Workshop on Visual Motion, pp. 156-162, (Oct. 1991).
Harris et al., "Physically-based visual simulation on graphics hardware," SIGGRAPH / Eurographics Workshop on Graphics Hardware, pp. 109-118, 160 (2002).
Harris et al., "Simulation of cloud dynamics on graphics hardware," Proceedings of Graphics Hardware, pp. 1-10 (2003).
Harris, "Real-Time Cloud Simulation and Rendering," PhD Dissertation (available as technical report #tr03-040), pp. 1-191 (2003).
Heeger et al., "Subspace methods for recovering rigid motion i: Algorithm and implementation," International Journal of Computer Vision, vol. 7, pp. 95-117, (1992).
Hensley et al., "A fast, energy-efficient z-comparator," Proceedings of Graphics Hardware, pp. 41-44, 2005.
Hensley et al., "A scalable counterflow-pipelined asynchronous radix-4 booth multiplier," Proceedings of the 11th IEEE International Symposium on Computer Design, IEEE Computer Society, pp. 1-10 (2005).

(56) References Cited

OTHER PUBLICATIONS

Hensley et al., "An area- and energy-efficient asynchronous booth multiplier for mobile devices," Proc. Int. Conf. Computer Design (ICCD), pp. 1-8, (2004).

Hensley et al., "Fast summed-area table generation and its applications," Proceedings of Eurographics 2005 and Computer Graphics Forum, vol. 24, No. 3, pp. 1-9 (2005).

Hensley et al., "Increasing Rendering Performance of Graphics Hardware," PhD dissertation, pp. 1-109 (2007).

Horn et al., "Interactive k-d tree GPU raytracing," Proceedings of the 2007 symposium on Interactive 3D graphics and games, I3D '07, pp. 167-174, New York, NY, USA, ACM, pp. 1-8 (2007).

Jacobs et al., "Managing latency in complex augmented reality systems," Proceedings of the 1997 symposium on Interactive 3D graphics, I3D '97, New York, NY, USA, ACM, pp. 1-7 (1997).

Jerald et al., "Scene-motion thresholds during head yaw for immersive virtual environments," ACM Transactions on Applied Perception (TAP), vol. 9, No. 1 p. 4:1-4:23 (2012).

Jerald et al., "Sensitivity to scene motion for phases of head yaws," Proceedings of the 5th symposium on Applied perception in graphics and visualization, pp. 155-162, ACM, (2008).

Jinwei Gu et al., "Coded rolling shutter photography: Flexible space-time sampling," 2010 IEEE International Conference on Computational Photography (ICCP), pp. 1-8 (Mar. 2010).

Jones et al., "Achieving Eye Contact in a One-to-Many 3D Video Teleconferencing System," ACM Transactions on Graphics, 28(3), pp. 1-8 (Jul. 2009).

Kelley et al., "Hardware accelerated rendering of csg and transparency," Proceedings of the 21st annual conference on Computer graphics and interactive techniques, SIGGRAPH '94, pp. 177-184, New York, NY, USA, ACM, pp. 1-8 (1994).

Kelshikar et al., "Real-time Terascale Implementation of Tele-immersion," Computational Science—ICCS 2003, vol. 2660, pp. 33-42 (Jun. 2003).

Lincoln et al., "Animatronic shader lamps avatars," Proceedings of the 2009 8th IEEE International Symposium on Mixed and Augmented Reality, ISMAR '09, pp. 27-33, Washington, DC, USA, IEEE Computer Society, (2009).

Lincoln et al., "Multi-view lenticular display for group teleconferencing," Proceedings of the 2nd International Conference on Immersive Telecommunications, IMMERSCOM '09, pp. 22:1-22:8, ICST, Brussels, Belgium, Belgium, Institute for Computer Sciences, Social-Informatics and Telecommunications Engineering,. (2009).

Maimone et al., "A first look at a telepresence system with room-sized real-time 3d capture and life-sized tracked display wall," 2011 21st International Conference on Artificial Reality and Telexistence (ICAT) pp. 1-6 (Nov. 2011).

Maimone et al., "Encumbrance-free telepresence system with real-time 3d capture and display using commodity depth cameras," 2011 10th IEEE International Symposium on Mixed and Augmented Reality (ISMAR), pp. 1-10 (Oct. 2011).

Maimone et al., "General-purpose telepresence with head-worn optical see-through displays and projector-based lighting," To appear in: IEEE Virtual Reality 2013, pp. 1-10 (Mar. 2013).

Maimone et al., "Computational Augmented Reality Eyeglasses," Mixed Augmented Reality (ISMAR), 2013 IEEE International Symposium, pp. 1-10 (2013).

Mark et al., "Post-rendering 3d warping," Proceedings of the 1997 symposium on Interactive 3D graphics, I3D '97, pp. 7-16, New York, NY, USA, ACM (1997).).

Muehlmann et al., "A new high speed CMOS camera for real-time tracking applications," Proceedings of the 2004 IEEE International Conference on Robotics and Automation (ICRA '04), vol. 5, pp. 5195-5200, (Apr.-May 1, 2004).

Murase et al., "Visual learning and recognition of 3-d objects from appearance," Int. J. Comput. Vision, vol. 14, No. 1, pp. 5-24, (Jan. 1995).

Nakamura, "Image Sensors and Signal Processing for Digital Still Cameras," CRC Press, Inc., Boca Raton, FL, USA, pp. 1-321(2005).

Nashel et al., "Random hole display: A non-uniform barrier autostereoscopic display," 3DTV Conference: The True Vision—Capture, Transmission and Display of 3D Video, 2009, pp. 1-4, (May 2009).

Neumann et al., "A vision of telepresence for medical consultations and other applications," Proceedings of the Sixth International Symposium on Robotics Research. pp. 1-7, (Oct. 1993).

Newcombe et al., "Live dense reconstruction with a single moving camera," 2010 IEEE Conference on Computer Vision and Pattern Recognition (CVPR), pp. 1-8 IEEE, (2010).

Niimi et al., "A parallel processor system for three-dimensional color graphics," SIGGRAPH Comput. Graph., vol. 18, No. 3, pp. 67-76, (Jan. 1984).

Non-Final Office Action for U.S. Appl. No. 14/401,833 (dated Oct. 28, 2016).

Non-Final Office Action for U.S. Appl. No. 14/401,833 (dated Dec. 14, 2015).

Notification of Transmittal of the International Search Report and the Written Opinion of the International Searching Authority, or the Declaration for International Application No. PCT/US2015/058959 (dated Mar. 3, 2016).

Notification of Transmittal of the International Search Report and the Written Opinion of the International Searching Authority, or the Declaration for International Application No. PCT/US2014/026349 (dated Jul. 28, 2014).

Notification of Transmittal of the International Search Report and the Written Opinion of the International Searching Authority, or the Declaration for International Application No. PCT/US2013/041614 (dated Aug. 27, 2013).

Olano et al., "Combatting rendering latency," Proceedings of the 1995 symposium on Interactive 3D graphics, I3D '95 New York, NY, USA, ACM, pp. 19-204 (1995).

Parker et al., "Optix: A general purpose ray tracing engine," ACM Transactions on Graphics, pp. 1-13 (Aug. 2010).

Pasman et al., "Accurate overlaying for mobile augmented reality," Preprint for Computers & Graphis, 23(6), pp. 875-881, (7 pages) (1999).

Pollefeys et al., "Detailed real-time urban 3d reconstruction from video," International Journal of Computer Vision, vol. 78, No. 2, pp. 1-43 (2008).

Pollefeys et al., "Self-calibration and metric reconstruction inspite of varying and unknown intrinsic camera parameters," International Journal of Computer Vision, vol. 32, No. 1, pp. 1-18 (1999).

Pollefeys et al., "Visual modeling with a hand-held camera," International Journal of Computer Vision, vol. 59, No. 3, pp. 1-52 (2004).

Pool et al., "An energy model for graphics processing units," 2010 IEEE International Conference on Computer Design (ICCD), pp. 409-416, (Oct. 2010).

Pool et al., "Energy-precision tradeoffs in mobile graphics processing units," Proc. Int. Conf. Computer Design (ICCD), p. 60-67, (2008).

Pool et al., "Lossless compression of variable-precision floating-point buffers on GPUs," Proc. Symposium on Interactive 3D Graphics (I3D), pp. 47-54 (Mar. 9-11, 2012).

Pool et al., "Power-gated arithmetic circuits for energy-precision tradeoffs in mobile graphics processing units," Journal of Low-Power Electronics (JOLPE), vol. 7, No. 2, pp. 1-44 (2011).

Pool et al., "Precision selection for energy-efficient pixel shaders," Proc. High Performance Graphics, ACM, pp. 159-168 (Aug. 5-7, 2011).

Raguram et al., "A comparative analysis of RANSAC techniques leading to adaptive real-time random sample consensus," Computer Vision—ECCV 2008, pp. 500-513, (2008).

Rolland et al., "Optical versus video see-through head-mounted displays," Medical Visualization, Presence: Teleoperators and Virtual Environments, pp. 287-309, (2000).

State et al., "Simulation-Based Design and Rapid Prototyping of a Parallax-Free, Orthoscopic Video See-Through Head-Mounted Display," Proceedings of the Fourth IEEE and ACM International Symposium on Mixed and Augmented Reality, pp. 1-4 (Oct. 2005).

(56) References Cited

OTHER PUBLICATIONS

Steinhurst et al., "Global Importance Sampling of Glossy Surfaces Using the Photon Map," IEEE Symposium on Interactive Ray Tracing, pp. 1-6 (2006).

Steinhurst et al., "Practical Photon Mapping in Hardware," PhD Dissertation, pp. 1-178 (2007).

Steinhurst et al., "Reducing Photon Mapping Bandwidth by Query Reordering," IEEE Transactions on Visualization and Computer Graphics, vol. 14, No. 1, pp. 13-24, (2008).

Steinhurst et al., "Reordering for Cache Conscious Photon Mapping," Proceedings of Graphics Interface, pp. 1-8 (2005).

Watkins, "A real time visible surface algorithm," PhD Thesis, Order No. AAI7023061, pp. 1-214 (1970).

Yang et al., "Differential camera tracking through linearizing the local appearance manifold," IEEE Conference on CVPR'07, pp. 1-8 (2007).

Ye et al., "A Practical Multi-Viewer Tabletop Autostereoscopic Display," 2010 9th IEEE International Symposium on Mixed and Augmented Reality (ISMAR), pp. 1-10 (Oct. 2010).

Applicant-Initiated Interview Summary for U.S. Appl. No. 14/401,833 (dated Dec. 17, 2018).

Non-Final Office Action for U.S. Appl. No. 15/522,765 (dated Nov. 15, 2018).

Final Office Action for U.S. Appl. No. 14/401,833 (dated Jun. 27, 2018).

Final Office Action for U.S. Appl. No. 15/522,765 (dated Apr. 11, 2019).

Notice of Allowance and Fee(s) Due for U.S. Appl. No. 14/401,833 (dated Mar. 25, 2019).

Applicant-Initiated Interview Summary for U.S. Appl. No. 15/522,765 (dated Feb. 8, 2019).

Applicant-Initiated Interview Summary for U.S. Appl. No. 15/522,765 (dated Jun. 17, 2019).

\* cited by examiner

| $E_{RMS}$ | $T_x$ (cm) | $T_y$ (cm) | $T_z$ (cm) | $\Theta_x$ (degree) | $\Theta_y$ (degree) | $\Theta_z$ (degree) | Rendering error (px) |
|---|---|---|---|---|---|---|---|
| 4-camera real data | 0.0468 | 0.0974 | 0.1064 | 0.0541 | 0.0776 | 0.0720 | 0.6804 |
| 6-camera real data | 0.1783 | 0.0890 | 0.1139 | 0.0326 | 0.0499 | 0.0959 | 0.7507 |
| HoloLens | 0.21 | 0.04 | 0.05 | 0.05 | 0.03 | 0.02 | 0.8249 |
| 4-camera synthetic data | 0.43 | 0.18 | 0.23 | 0.14 | 0.23 | 0.06 | 2.55 |
| 6-camera synthetic data | 0.38 | 0.27 | 0.22 | 0.13 | 0.22 | 0.08 | 2.39 |
| 20 camera system (Bapat et al.) | 0.67 | 0.83 | 1.34 | 0.21 | 0.47 | 0.29 | 4.63 |

FIG. 8

METHODS, SYSTEMS, AND COMPUTER-READABLE MEDIA FOR UTILIZING RADIAL DISTORTION TO ESTIMATE A POSE CONFIGURATION

GOVERNMENT INTEREST

This invention was made with government support under Grant Numbers U.S. Pat. No. 1,349,074 and CNS-1405847 awarded by the National Science Foundation. The government has certain rights in the invention.

TECHNICAL FIELD

The subject matter described herein relates to methods and systems for tracking camera motion by leveraging processed radial distortion and rolling shutter capture data. More particularly, the subject matter described herein relates to methods, systems, and computer-readable media for utilizing radial distortion to estimate a pose configuration.

BACKGROUND

The recent resurgence of augmented reality and virtual reality (AR/VR) has provided challenging computer vision problems of drastically higher requirements. For example, recent state-of-the-art low-latency rendering techniques assume that very high-frequency (>30 kHz) tracking is available. On the other hand, most commercial AR/VR systems provide only rotational tracking, limiting the full immersive experience, while other systems provide full six degrees of freedom (6-DoF) tracking (i.e. rotation and translation tracking) while working at ~1 kHz frequencies. This full 6-DoF tracking comes at a cost where external lighthouses or infrared cameras are needed, which restricts the portability of the device compared to entirely on-device ("inside-out") tracking solutions. It is well understood that high tracking rates are critical for AR/VR systems for immersive experiences, yet there currently exists no practical, portable system that comes close to next-generation tracking performance.

Modern imaging devices have much potential for inside-out camera-based device tracking. For example, the ubiquitous presence of rolling shutter (RS) cameras in almost every cell-phone and low-cost camera affords developers opportunities to attempt to leverage RS motion capture for a number of applications, including AR/VR. In rolling shutter capture, each row (or column) is captured at a slightly different time, a rapid process that cheaply approximates a global image exposure. However, researchers have previously strived to remove the effects of this non-simultaneous exposure of the image rows, as it results in noticeable artifacts if the camera is moved during the exposure. In many computer vision applications, other imaging properties are considered negative, as well: Prominently, radial lens distortion is typically corrected for after image formation. Camera-based tracking approaches have historically adopted the same attitudes towards rolling shutter and radial distortion (e.g., radial (lens) distortion), treating these image features as camera artifacts that have to be overcome and/or corrected for in order to apply typical camera models, e.g. pinhole camera model, and scene reconstruction methods.

Further, many of the commercial AR/VR systems rely on camera-based tracking but, for cost reasons, use standard cameras with frames rates of a few tens of frames per second (e.g. a 60 hertz (Hz) external infrared camera). In order to achieve the required higher frame rates for the tracking they revert to leveraging gyroscope data to improve the tracking frame rate. However, positional tracking still remains difficult to achieve, as inertial measurement units (IMUs) drift. Even using high-frame-rate global shutter cameras is not the solution, as the high frame rates required lead to a decrease in the maximum possible exposure time (equal to the inverse of the kHz frame rate), which makes capturing sufficient light impractical, especially indoors where AR/VR systems are frequently used. In addition, most of these systems are head-worn and require small-form-factor cameras, thereby limiting the amount of light captured even further.

SUMMARY

According to one aspect, the subject matter described herein includes a method for utilizing radial distortion to estimate a pose configuration. The method includes receiving, from each of a plurality of camera devices, an input pixel row of a radially distorted image and conducting a row comparison between each of the input pixel rows and a respectively associated synthesized pixel row. The method further includes approximating, for each row comparison, a span of a curve in an image space with a plurality of segments and computing, for each of the plurality of segments, a constraint. The method also includes utilizing the constraints to estimate a pose configuration.

According to another aspect, the subject matter described herein includes a system for utilizing radial distortion to estimate a pose configuration. The system includes a plurality of camera devices and a pose-tracking device. The pose-tracking device is configured for receiving an input pixel row of a radially distorted image from each of a plurality of camera devices, conducting a row comparison between each of the input pixel rows and a respectively associated synthesized pixel row, approximating, for each row comparison, a span of a curve in an image space with a plurality of segments, computing, for each of the plurality of segments, a constraint, and utilizing the constraints to estimate a pose configuration.

The subject matter described herein can be implemented in software in combination with hardware and/or firmware. For example, the subject matter described herein can be implemented in software executed by a processor. In one exemplary implementation, the subject matter described herein can be implemented using a non-transitory computer-readable medium having stored thereon computer-executable instructions that when executed by the processor of a computer control the computer to perform steps. Exemplary computer-readable media suitable for implementing the subject matter described herein include non-transitory computer-readable media, such as disk memory devices, chip memory devices, programmable logic devices, and application-specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 8 is a table detailing root mean square (RMS) errors for tracking estimates between a plurality of systems according to an embodiment of the subject matter described herein.

DETAILED DESCRIPTION

Figure 1:
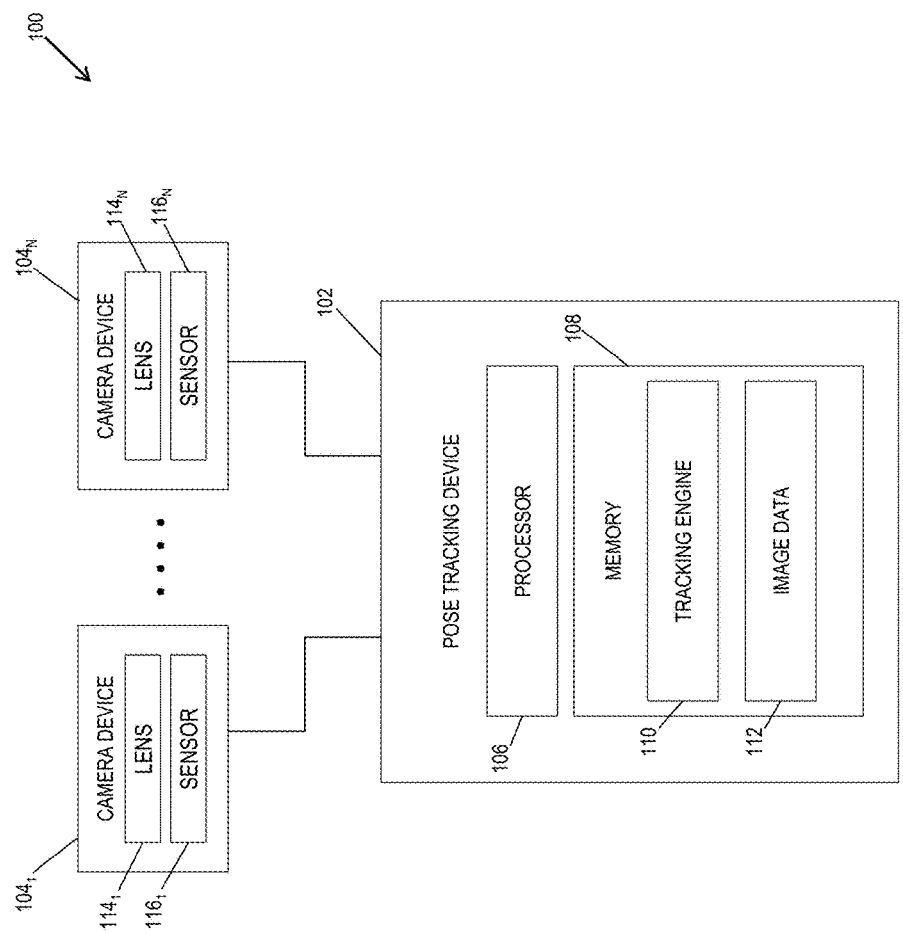
FIG. 1 is a block diagram illustrating an exemplary system for utilizing radial distortion to estimate a pose configuration according to an embodiment of the subject matter described herein.

In accordance with the subject matter disclosed herein, systems, methods, and computer-readable media are provided for utilizing radial distortion to estimate a pose configuration. In particular, the disclosed subject matter provides a multi-camera tracking system and method that jointly leverages the information introduced by rolling shutter and radial distortion (e.g., radial lens distortion) as a feature to achieve superior performance with respect to high-frequency camera pose estimation. As used herein, the term "pose" refers to the apparent position (e.g., the X, Y, and Z coordinates) and orientation (e.g., the azimuth and inclination or the pitch, roll, and yaw) of the viewer, which determines what portion of the real world the viewer sees at a given instant.

Notably, the disclosed system is capable of attaining high tracking rates that were previously unachievable. The approach explicitly leverages rolling shutter capture and radial distortion to process individual rows rather than image frames for quality camera motion estimation. For example, the system can estimate a per-row 6-DoF pose of a rolling shutter camera by tracking multiple points on a radially distorted row whose rays span a curved surface in three-dimensional (3D) space. Although tracking systems for rolling shutter cameras exist, the disclosed subject matter is the first to leverage radial distortion to measure a per-row pose, thereby enabling the system to use less than half the number of cameras than the previous state of the art and/or leveraging the additional constraints to achieve a more robust estimate. The system has been validated using both synthetic and real imagery.

In some embodiments, the disclosed system and method drastically improve the 6-DoF tracking frequency in AR/VR devices while keeping comparable tracking accuracy with respect to the current state of the art and currently available commercial systems (e.g., Microsoft HoloLens). The disclosed camera-based approach uses standard commodity cameras to leverage two unlikely camera 'features' for low-cost, minimal configuration tracking: rolling shutter and radial distortion. As indicated above, both of these types of distortion are usually considered to be nuisances in computer vision applications.

However, the disclosed subject matter further recognizes that radial distortion in a camera lens (e.g., a rolling shutter camera lens) induces constraints (e.g., "tracking constraints") on the tracking system, which in turn reduces the number of camera devices required. In some embodiments, the disclosed subject matter forgoes compensating for the exhibited radial distortion and instead directly utilizes the radially distorted rolling shutter image as captured and distorted by the camera device. Specifically, the disclosed system may compare a distorted input pixel row (without any undistortion processing) and a distorted synthesized pixel row to derive tracking constraints. Doing so yields a more efficient computation, which is of significant importance for systems that implement high-frequency tracking.

Reference will now be made in detail to exemplary embodiments of the present invention, examples of which are illustrated in the accompanying drawings. Wherever possible, the same reference numbers will be used throughout the drawings to refer to the same or like parts.

FIG. 1 depicts a multi-camera tracking system 100 that includes a pose-tracking device 102 and a plurality of camera devices 104. Each camera device 104 includes at least one lens 114 and a sensor 116. In some embodiments, each camera device 104 comprises a rolling shutter camera that captures a two-dimensional image by exposing each row of a frame at a later point in time than the previous row. Camera devices 104 may also output image data row by row as soon as the exposure for that row is complete. In some embodiments, camera devices $104_{1...N}$ are low-cost, rolling shutter cameras, each equipped with a standard two-dimensional (2D) image sensor 116. Each of the camera devices $104_{1...N}$ provides an interface to the sensor's raw scan-line data. This is unlike commercially available cameras, which only allow the retrieval of entire frames of data despite the fact that some scan lines of a frame are fully formed long before the frame is exposed in full. The use of 2D image sensors does not slow down pose estimation, since very few scan lines of an image are processed by pose-tracking device 102 at any given time.

In some embodiments, sensor 116 may comprise a complementary metal oxide semiconductor (CMOS) image sensor commonly found in handheld devices and mobile platforms that employs a rolling shutter. A rolling shutter causes each row of a frame to begin its exposure process at a slightly later time than the previous row. Hence each individual row is a "snapshot" of the scene at a slightly different point in time, and for moving cameras also at a different spatial position and orientation. The exact time elapsed between the start of two rows' integrations depends upon the frame rate of the camera device. As soon as a rolling shutter has finished exposing a particular row of pixels, that row may be read out into line memory or image data 112 in the pose-tracking device 102.

In some embodiments, pose-tracking device 102 includes at least one processor 106 and a memory 108. Processor 106 may include any hardware processing unit, such as a central processing unit (CPU), a microcontroller, a microprocessor, or any other like hardware-based processor unit that is configured to execute and/or utilize tracking engine 110 in pose-tracking device 102. Memory 108 may include any memory device or component that is configured for data storage, such as random access memory (RAM), read only memory (ROM), optical read/write memory, cache memory, magnetic read/write memory, flash memory, and the like. Notably, memory 108 can be configured to store a tracking engine 110 and image data 112. In some embodiments, tracking engine 110 can include a software application or module that is stored in memory 108 and when executed by processor 106 executes a number of image tracking and processing steps (e.g., see steps of FIG. 6).

Tracking engine 110 can be configured to receive image data from each of the plurality of camera devices 104. In some embodiments, tracking engine 110 receives the image data from a camera device 104 either on a row-by-row basis or a frame-by-frame basis. For example, tracking engine 110 may receive, from each individual camera device 104, a newly captured input pixel row (i.e., a "current" distorted pixel row) of a radially distorted image. Notably, the received input pixel row may be distorted (e.g., caused by a lens 114 of camera device 104 at the time of the original capture of light rays from real-world scenery). Once the distorted pixel row is received, tracking engine 110 can be configured to conduct a row comparison between each of the input pixel rows and a respectively associated synthesized pixel row. For example, in some embodiments the tracking engine 110 may be configured to implicitly or explicitly generate and/or synthesize a curve in an undistorted image space based on the "undistorting" of the distorted input pixel rows (e.g., separately processing each of the input pixel rows received from the plurality of camera devices). In some embodiments, tracking engine 110 can generate and/or synthesize the curve by executing a number of steps. For example, tracking engine 110 can generate and/or synthesize an associated distorted row based on previous captured frame data. In some embodiments, tracking engine 110 can utilize homography-based warp techniques (as described below) to generate the synthesized distorted row. In some embodiments, the synthetic rows generated by tracking engine 110 may comprise data extracted from rows in previously captured frames of real imagery. Tracking engine 110 is further configured to execute a mathematical comparison of the synthesized row and the distorted current row received from camera device 104. Notably, tracking engine 110 compares the two rows at multiple points, wherein the comparison yields values that correspond to the center of each of the small segments (e.g., line segments or curved line segments) approximating the curve in an image space, namely an undistorted image space. In some alternate embodiments and as described below, the image space may instead be a distorted image space if tracking engine 110 compares a radially distorted pixel row and a synthesized distorted pixel row. In some alternate embodiments, the row comparison performed by tracking engine 110 includes the mathematical correction for the distortion instead of undistorting the image itself. For example, the tracking engine may also utilize the linearly indexed coordinates (x',row) of the pixels of a distorted image row in lieu of pixels obtained from an undistorted image. More specifically, the tracking engine can apply the undistortion process to the coordinates of the pixels (x',row) to obtain the "true" undistorted coordinates of the pixel (x,y). This process yields the same (x,y) pixel coordinates as the aforementioned embodiments. Notably, the algorithm for processing the pixel coordinates is also used for undistorting a distorted pixel row, but the image itself is never undistorted, nor is an undistorted row ever generated or synthesized in memory.

As such, tracking engine 110 approximates the positioning of each separate curve (i.e., one for each input pixel row) in the undistorted image space using the plurality of line segments (or curved line segments) and subsequently solves a linear system that yields the curve. After tracking engine 110 yield the curves for each input pixel row, tracking engine 110 can be configured to compute a constraint (e.g., a "tracking constraint") for each of the plurality of aforementioned line segments. In some embodiments, the aforementioned line segments (or curved line segments) may be used by tracking engine 110 to compute a linear constraint for each row. For example, individual camera devices provide C constraints for a single input row. Therefore, if there are a number of N camera devices, tracking engine 110 will produce "N times C" constraints by collecting all the constraints derived from the input provided by all of the camera devices $104_{1 \ldots N}$. Further, tracking engine 110 may then process all of the computed line constraints to estimate a pose configuration (e.g., a head pose position, camera cluster position, head-mounted display position, etc.). As used herein, the term "constraint" or "tracking constraint" is intended to define or include a mathematical condition that an estimated or predicted set of numerical values must satisfy. Multiple constraints together form a "system of equations" that together define a feasible, possibly singular, set of solutions for a set of numerical values. For example, tracking constraints in the context of the disclosed subject matter can refer to the set of mathematical equalities (or more generally, formulas) that enable the disclosed tracking engine to unambiguously recover a pose configuration. The system of equations governing a tracking constraint may comprise linear constraints but is not necessarily required to be linear in nature.

As mentioned above, the disclosed system (e.g., pose-tracking device 102 and/or tracking engine 110) may be configured to convert rolling shutter "distortion" into an enabling feature for high-frequency tracking. Notably, the disclosed system may utilize radial distortion to serve as a mechanism that greatly reduces a tracking system's complexity (e.g., by reducing the number of requisite camera devices).

In some embodiments, the disclosed system (e.g., pose-tracking device 102 and/or tracking engine 110) can extend and/or enhance a high-frequency 6-DoF tracking method (as disclosed in Bapat et al.; see listed reference [5] below) that uses a cluster of rolling shutter cameras arranged in stereo-pairs. For example, each row of the rolling shutter camera is treated as a line-camera capturing the scene at high frequency. Each row is then processed to measure pixel disparities for a stereo camera in order to measure a depth of a single point per camera. The tracking engine many also measure pixel shift of this point across time to obtain a constraint on the cluster motion (e.g., head-mounted display device). Such a formulation provides a single constraint per stereo-pair in a system of linear equations, which may require the use of at least 12 cameras (in previously known tracking systems such as disclosed in Bapat et al.). For example, previous systems may use 10 stereo-pairs that are each exactly in plane. Those previous systems also enforce that the left-right rows expose at the same time. This is difficult to achieve in reality, and at kilohertz (kHz) capture rates, particularly as the stereo-pairs in the previous systems are not genlocked. This time-staggering of row exposures allows the previous systems to track points with different y coordinates, reducing the requisite number of cameras from 6 to 5 stereo-pairs. The disclosed system notably attempts to exploit the different rows of a rolling shutter camera as independent high-frequency line cameras. Given this high-frequency sampling, the disclosed system is able to leverage the naturally occurring radial distortion of the lens as a feature for motion estimation to obtain a complementary set of constraints, without the need of row-level in-step capture. Further, the tracking exhibited by the disclosed system benefits from a wider field of view where radial distortion is more pronounced. Such cameras are commonly used in tracking research (e.g. using a 130° field-of-view (FoV) camera is recommended for Large Scale Direct Monocular (LSD)-Simultaneous Localization and Mapping (SLAM)).

Figure 2:
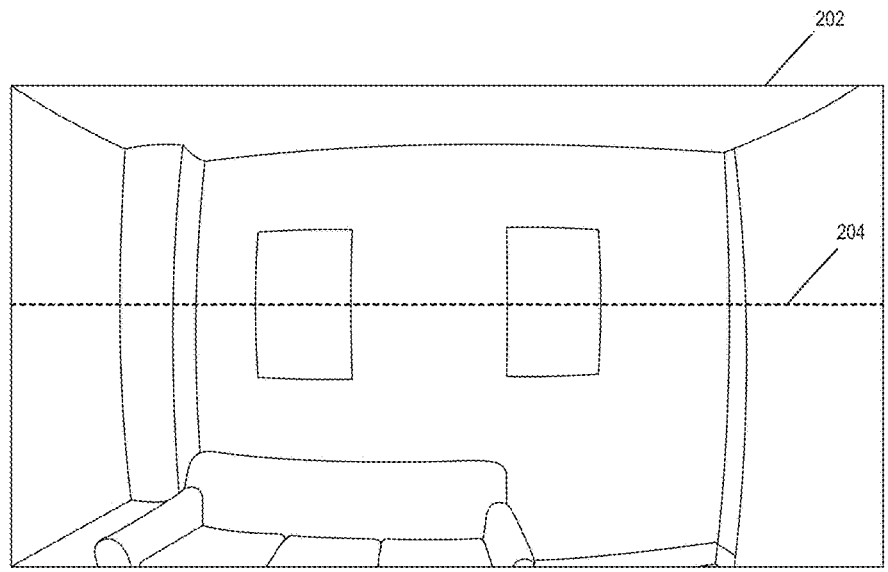
FIG. 2 illustrates a radially distorted image according to an embodiment of the subject matter described herein.
Figure 3:
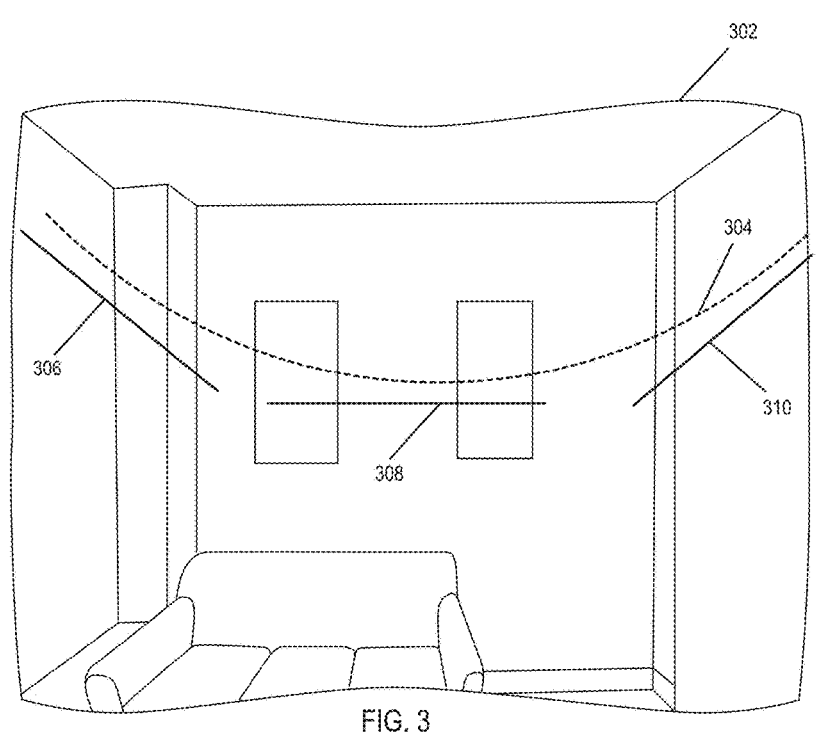
FIG. 3 illustrates an undistorted image space based on the radially distorted image according to an embodiment of the subject matter described herein.
Figure 4A:
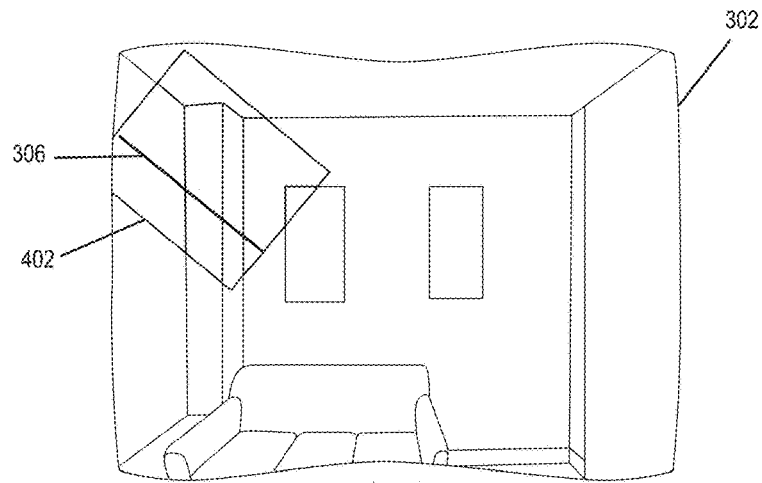
FIGS. 4A-4C respectively illustrate undistorted image space containing a single independent constraint according to an embodiment of the subject matter described herein.
Figure 4B:
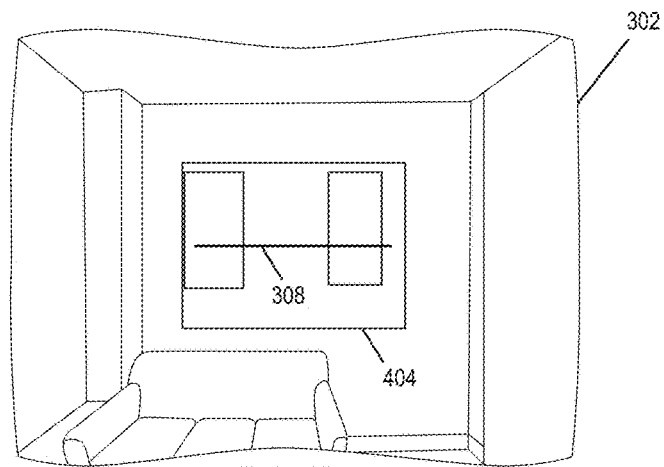
Figure 4C:
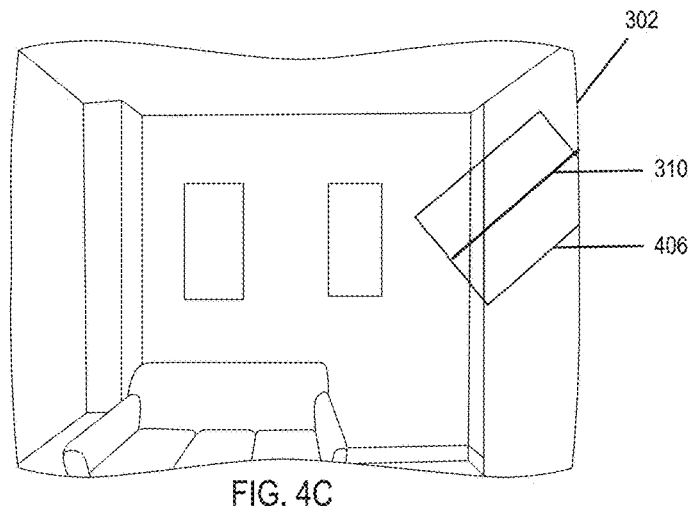

Ideal pinhole rolling shutter cameras only allow for a single linear constraint per row-image. One key insight afforded by the disclosed system is that the process of undistorting a radially distorted row yields a curve in the image space that can be approximated by multiple line segments as shown in FIGS. 2-4. For example, FIG. 2 depicts an example radially distorted image 202. Specifically, the objects and elements in image 202 are captured by a camera exhibiting barrel distortion and pincushion distortion. Distorted image 202 further includes dashed line 204, which may represent an input pixel row that is captured by a rolling shutter camera device. FIG. 3 depicts an undistorted image space 302 corresponding to distorted image 202. Notably, a curve 304 is generated and based from line 204 shown in FIG. 2. For some embodiments, as described herein, the disclosed tracking engine is configured to conduct a row comparison between each of the captured pixel rows and a plurality of respective synthesized pixel rows. For example, the tracking engine can be configured to utilize the row comparison process to produce curve 304. The disclosed tracking engine is further able to synthesize a distorted row from one or more previously captured rows using homography-based warp techniques. By comparing the synthesized distorted row with a "current" distorted input pixel row (e.g., as represented by dashed line 204 in FIG. 2), the tracking engine is able to calculate the center of each of the small line segments 306-310 corresponding to undistorted curve 304. The tracking engine may then approximate the span of curve 304 in the undistorted image space 302 with the linear line segments 306-310. Although the use of only three line segments 306-310 are depicted in FIG. 3, it is understood that a larger number of local linear approximations that better fit the undistorted curve 304 can be used without departing from the scope of the disclosed subject matter. By approximating curve 304 with linear line segments 306-310 as shown in FIGS. 4A-C, the tracking engine can produce multiple virtual cameras that respectively provide an independent constraint (e.g., a linear constraint). In particular, the tracking engine may be able to process each line segment individually as noted in image sections 402-406. As such, a single radially distorted line-image (e.g., line 204) approximates the multiple pinhole cameras used in the system disclosed in Bapat et al.

Linear shifts can thus be computed for each segment independently, affording a linear constraint per segment, thereby substantially reducing the number of cameras. In some instances, such a reduction of cameras can amount to at least 60% (e.g., from 10 cameras from the system described in Bapat et al. to 2-4 cameras used by the disclosed system). In untethered AR/VR devices, reducing system complexity is critical, and the present system substantially lowers the video bandwidth and burdens a user headset with less weight by using fewer cameras. The disclosed subject matter exhibits a number of advantages over the system disclosed in Bapat et al. while maintaining its benefits of kHz tracking frequencies, such as: 1) Instead of 10 cameras, the tracking engine of the disclosed system can conduct high-frequency tracking using just 2-4 camera devices. The camera devices are arranged so that every camera has overlap with at least one other camera. 2) The disclosed system does not need guarantees of physically in-plane stereo camera sensors for depth estimation, as a depth map is propagated for each camera across time. Rather, the disclosed system benefits from the rotation between cameras, as each view provides additional scene coverage. 3) The disclosed tracking engine exploits the camera lens' radial distortion and leverages it to track multiple points per row.

As described herein, the time step $\Delta t$ is defined from $t_1$ to $t_2$ where $t_2 > t_1$, and the magnitude of $t_2 - t_1$ may vary. Further, bold capital letters define a matrix, e.g., M. A relative transformation from space w to space c is defined as $^cT_w$, which transforms points in space w to space c and a transform within a space w to be $T_w$.

The tracking method disclosed in Bapat et al. uses a cluster of cameras to track the head-pose starting from the identity pose. There are N cameras in the cluster, and the relative pose of camera n $\in$ N in the cluster space is denoted by $^nT_{cl}$ which can be estimated by performing an extrinsic calibration.

The 6-DoF head-pose tracking is performed by measuring small pixel shifts between the projection of a 3D world point $X_w = [x_w\ y_w\ z_w\ 1]^T$ in camera n at time instants $t_1$ and $t_2$, and transforming the shifts into the 3D space using the depth of the point. These operations can be expressed for a camera n as follows in Equation (1):

$$X(n, t_1) = {}^nT_{cl}{}^{cl}T_w(t_1)X_w \quad (1)$$
$$X(n, t_2) = {}^nT_{cl}{}^{cl}T_w(t_2)X_w,$$

where $X(n,t_1) = [x_1\ y_1\ z_1\ 1]^T$ and $X(n,t_2) = [x_2\ y_2\ z_2\ 1]^T$ correspond to the same 3D world point $X_w$, and are expressed relative to camera n at times $t_1$ and $t_2$ respectively. The transformation $^{cl}T_w$ transforms the 3D point $X_w$ from world space to the cluster space.

The 3D points $X(n,t_1)$ and $X(n,t_2)$ are related to the corresponding pixels $x(t_1)$ and $x(t_2)$, $x(t_1) = [p_x(t_1)p_y(t_1)1]^T$, via the intrinsic matrix $K_n$ and depths $z(t_1), z(t_2)$ as defined by the following relations in Equation (2):

$$X(n, t_1) = z(t_1)K_n^{-1}x(t_1) \quad (2)$$
$$X(n, t_2) = z(t_2)K_n^{-1}x(t_2).$$

Tracking at high frequencies allows the assumption of small relative motion at each time step. The small motion approximation for the combined transform is denoted as $^{cl}T_w(t_2)^{cl}T_w^{-1}(t_1)$ by $\delta M_{cl}$. The cluster's approximate small motion $\delta M_{cl}$ can be expressed in matrix form in Equation (3) as:

$$\delta M_{cl} = \begin{bmatrix} 1 & \theta_z & -\theta_y & -t_x \\ -\theta_z & 1 & \theta_x & -t_y \\ -\theta_y & -\theta_x & 1 & -t_z \\ 0 & 0 & 0 & 1 \end{bmatrix}. \quad (3)$$

Using the small motion assumption, Equation (1) can be simplified to Equation (4) as:

$$X(n,t_2) = {}^nT_{cl}\delta M_{cl}{}^nT_{cl}X(n,t_1). \quad (4)$$

The depth $z(t_1)$ is estimated using the rows captured at time $t_1$ from the left and right cameras in the stereo-pair via measuring pixel disparity. To estimate motion, temporal stereo is used to measure the shift in pixels $p_x(t_2) - p_x(t_1)$ across the time step $\Delta t$.

Using Equation (2), image points are substituted for 3D points because the measurements are in terms of pixels. Subsequently, a linear system is formulated by rearranging Equation (4) to the form CAY=CB, where C is a diagonal matrix of weighting factors estimated according to the confidence in the measured shifts and $Y=[\theta_x \ \theta_y \ \theta_z \ t_x \ t_y \ t_z]^T$ represents the unknown 6-DoF motion vector of the camera. Matrix A captures the cluster configuration and the 3D points being tracked, while vector B captures the shift measurements.

Notably, the proof-of-concept high-frequency tracking method from the system disclosed in Bapat et al. assumes ideal conditions regarding row-level in-step exposure and exactly in-plane stereo-pairs. This system further assumes a perfect lens, i.e., radial distortion is treated as an artifact and thereby "corrected" during preprocessing or experiments. Due to this, the rectification and undistortion of the images are necessarily performed to make the input images more amenable. This pre-processing scheme, however, blends neighboring rows captured at different times during the radial undistortion and rectification steps and reduces image size. In contrast, the disclosed tracking engine and/or pose-tracking device leverages the full breadth of the original image information to obtain tracking with fewer cameras.

Radial Distortion

Figure 5:
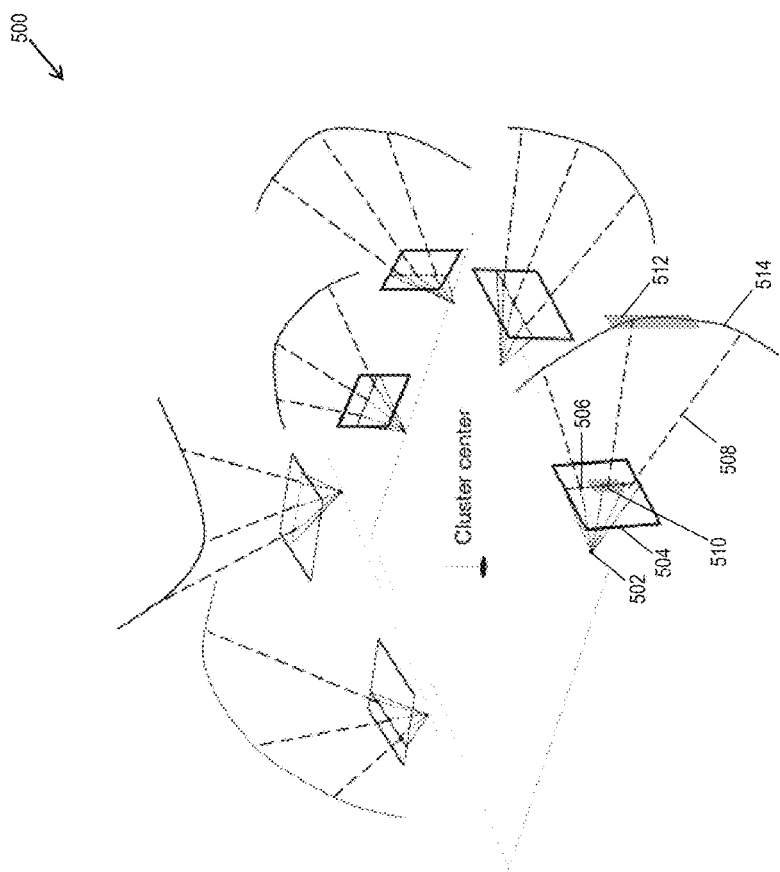
FIG. 5 is an illustration of a camera device cluster system according to an embodiment of the subject matter described herein.

Significant radial distortion is observed in wide-angle cameras and activity cameras (e.g., GoPro cameras). Such wide-angular cameras are preferred for more stable tracking. Radial distortion transforms image rows to curves, and hence rays corresponding to each row span a curved surface in 3D space rather than a plane as assumed in the pinhole model. As shown in FIG. 5, due to radial distortion, rows 506 of rolling shutter images 504 correspond to rays 508 which span a curve 514 in space, thereby sampling interesting geometries. The use of rolling shutter notably provides a dense sampling of the scene in time. The combination of high-frequency sampling and curved sampling of the scene afforded by a rolling shutter camera 502 provides more information than traditional cameras. The highlighted region 510 reflects the image region 512 corresponding to the curve.

In some embodiments, radial distortion is modeled and the curved mapping introduced by it is explicitly leveraged to measure points at different rows in the undistorted image space. The disclosed system utilizes two parameters, $k_1$ and $k_2$. Although the following example utilizes the first two parameters of Brown's radial distortion model, other distortion models may also be used without departing from the scope of the disclosed subject matter. The only requirement using such distortion models for the disclosed approach is that these distortion models should reflect the changing y-coordinate of the row in the undistorted image space. These parameters transform an undistorted normalized pixel $(\tilde{x}_u, \tilde{y}_u)$ into a distorted normalized pixel $(\tilde{x}_d, \tilde{y}_d)$ as shown in Equation (5):

$$\tilde{x}_d = \tilde{x}_u(1 + k_1 r^2 + k_2 r^4) \quad (5)$$
$$\tilde{y}_d = \tilde{y}_u(1 + k_1 r^2 + k_2 r^4)$$
$$r^2 = \tilde{x}_d^2 + \tilde{y}_d^2.$$

When such a distorted row is captured by a rolling shutter camera, the mapping from the 3D world point to the image is dependent on the time at which a row is exposed, as well as the distortion transformation.

As used herein, the intrinsic camera parameters are omitted for brevity and assume normalized camera coordinates for the image points. The disclosed tracking engine and/or pose-tracking device leverages radial distortion to relax two restrictions: firstly, radial distortion bends the row into a curve in the image plane, which means that shifts measured at different $\tilde{x}_d$ positions at the same row $\tilde{y}_d$ have different $\tilde{y}_u$ locations. This has a similar effect as the time staggering observed in real cameras, e.g., as employed by the system in Bapat et al. Additionally, multiple points per row are tracked, as opposed to a single point, providing more constraints, which enables the tracking engine to track using fewer cameras.

Rolling shutter provides row-wise capture, and the disclosed tracking engine measures how the current row has shifted across time in the horizontal direction. In a given row, the 3D X-coordinate can be expressed in terms of $\tilde{x}_u$ pixel positions at the two time instants $t_1$ and $t_2$ using the pixel shift $s_t$ as follows in Equation (6):

$$x(t_2) = \tilde{x}_u(t_2)z(t_2) \approx (\tilde{x}_u(t_1) + s_t)z(t_1) = x(t_1) + s_t z(t_1) \quad (6)$$

Linear Independent Constraints

The linear independence of the constraints obtained for different points on the row whose rays span a 3D curved surface is described and shown below. Consider Equation (4) with $^nT_{cl}$ as identity for simplicity (corresponding to the anchor camera in the cluster). The horizontal shift $s_t$ corresponds to the first row of this vector equation. Combining Equation (4) with Equation (6), the following Equation (7) is obtained:

$$x(t_2) = x(t_1) - \theta_z \tilde{y}_u z(t_1) + \theta_y z(t_1) + t_x \Rightarrow s_t = -\theta_z \tilde{y}_u + \theta_y + \frac{t_x}{z(t_1)}. \quad (7)$$

In Equation (7), for a given fixed $\tilde{y}_u$ and small motion $\delta M_w$, the only way the observed pixel shift $s_t$ can change is due to the depth of the point $z(t_1)$, which is scene dependent. That is one reason the system disclosed in Bapat et al. has to rely on more cameras to obtain sufficiently many constraints. In contrast, the disclosed system overcomes this inherent limitation by embracing the naturally occurring radial distortion by recognizing that, due to the distortion, each radially distorted row can span a curve in undistorted space. Hence, the disclosed tracking engine can extract an independent constraint from a piece-wise local linear segment in undistorted space as depicted in FIGS. 2-4, thereby providing multiple independent constraints per radially distorted row. The additional cameras in the cluster provide even more constraints. This is imperative for reducing the required number of physical cameras in the disclosed system, as each camera in the cluster provides multiple constraints at each point in time as opposed to just one constraint. Similar analysis can be performed for $^nT_{cl}$ not equal to identity, which is the case for the rest of the cameras in the cluster. The linear independence of the constraints still persists, as the choice of coordinate system to express poses $^nT_{cl}$ for the cameras is arbitrary, and the constraints are obtained from a single row of each camera.

The stability of such an over-determined linear system can be examined using the condition number. As an example, the condition number of the present linear system when configured to use a 4- or 6-camera cluster is of the same order as that of the 10-camera system disclosed in Bapat et al. Note that the number of constraints depends upon the extent of radial distortion present in the image.

Higher radial distortion would give more varying $\tilde{y}_2$ locations for the sampled $\tilde{y}_d$ locations, making the system more stable. It may be assumed that significant radial distortion exists due to the camera lens as experienced in experimentations. Small distortion, in the range of one pixel, is also not sufficient, as the constraints obtained from a single row are similar to each other, forming an ill-conditioned system.

Homography-Based Warp

In some embodiments, the disclosed tracking engine and/or pose-tracking device may be configured to process the radially distorted rolling shutter rows as soon as the rows become available. To achieve this, for each incoming distorted row, the disclosed tracking engine synthesizes a reconstructed row from the older frames for measuring shifts. This reconstructed row can be created by sampling from a global shutter undistorted image frame $F_{GS}$ with absolute pose $T_{ref}$. This frame is synthesized from previous row images. To create $F_{GS}$, the disclosed tracking engine splits the rotational homography warp of $H=K*R_{ref}*R_{row}^{-1}*K^{-1}$ that maps each rolling shutter row to the reference pose by creating two lookup tables, i.e., 1) a lookup table to undistort previous frames and adjust their rotation by application of $R_{row}^{-1}*K^{-1}$ and 2) a similar table for $K*R_{ref}$. The creation and use of these two lookup tables enables the disclosed system to avoid redundant computation when the reference pose $T_{ref}$ changes. The reference pose is adaptively selected by the disclosed tracking engine such that the motion between the reference pose and the current row is within a predefined threshold.

Robust Shift Estimation

As the tracking engine directly compares distorted rows, small errors in the pixel shift measurements can yield a result with significant errors depending upon their corresponding depth and position in the distorted space. To mitigate this, the tracking engine uses a robust double exponential Holt-Winters smoothing filter to remove outlier shift estimates. For a time-series $m_t$, this filter with trend $B_t$ is defined as follows in Equation (8):

$$\tilde{m}_t = \alpha m_t^* + (1-\alpha)(\tilde{m}_{t-1} + B_{t-1}) \qquad (8)$$
$$\tilde{B}_t = \beta(\tilde{m}_t - \tilde{m}_{t-1}) + (1-\beta)B_{t-1},$$

where $\alpha$ and $\beta$ are filter parameters and "tilde" denotes the filtered data. Notably, $m_t^*$ is a 'cleaned' version of $m_t$ using Huber loss $\Psi$ to penalize large differences between noisy estimates $m_t$ and one-step forecasts $m_{t|t+1}$. The cleaned version $m_t^*$ is calculated as follows in Equation (9):

$$m_t^* = \Psi\left(\frac{m_t - m_{t|t-1}}{\hat{\sigma}_t}\right)\hat{\sigma}_t + m_{t|t-1}. \qquad (9)$$

The scale of this difference is estimated by a slowly varying $\tau^2$-scale estimate $\hat{\sigma}_t$, which is highly robust to outliers.

Cluster Configuration

In some embodiments, the placement of the camera devices in the cluster affects the tracking estimates according to Equation (4). For example, the disclosed system utilized two cluster configurations in experiments: 1) a 4-camera configuration, and 2) a 6-camera configuration. The even-numbered cameras were rotated by 90° in the image plane and have translations and small rotations in all three directions with respect to the odd numbered cameras. As described above, FIG. 5 depicts an example configuration of a 6-camera device cluster. Although using a 2-camera configuration is possible as the problem is well-posed, the first two cameras have principal axes mostly along the Z direction (forward) creating an ill-conditioned linear system. Thus, measurements constraining the Z direction are highly sensitive to noise, and the tracking accuracy may be unsatisfactory.

The overlap between adjacent cameras in the cluster configuration can be decreased to extend the overall field of view of the tracking system. A depth map per camera may be estimated and the large overlap can be used to primarily bootstrap the depth estimation in the experiments. A possible reduction in overlap can be achieved if bootstrapping is performed using stereo over multiple baselines across time, as in LSD-SLAM.

Figure 6:
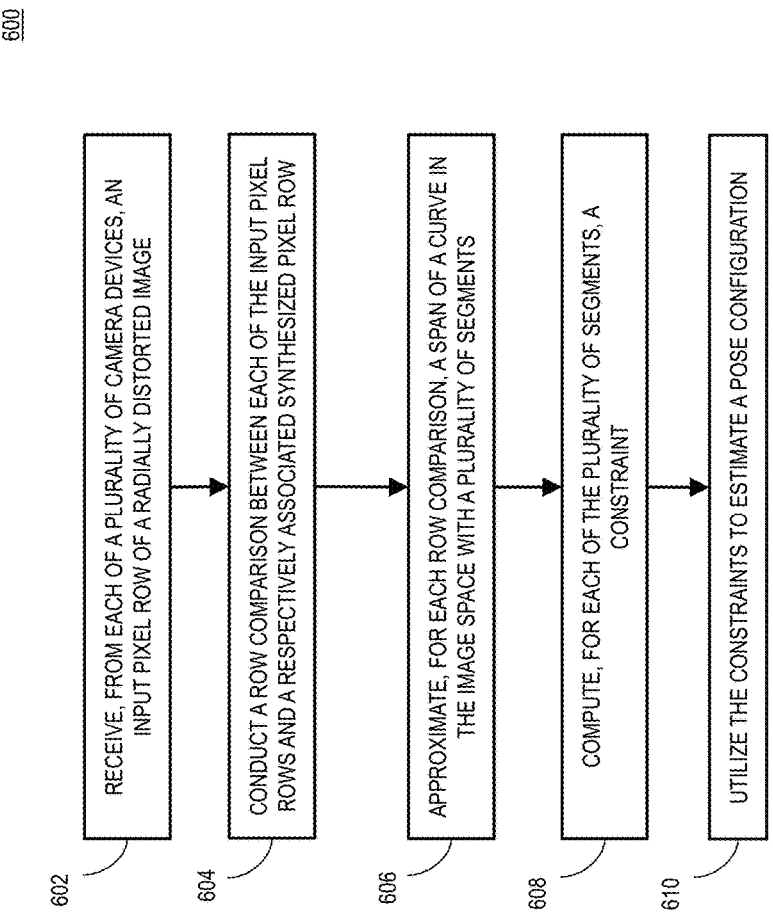
FIG. 6 is a flow chart illustrating an exemplary process for utilizing radial distortion to estimate a pose configuration according to an embodiment of the subject matter described herein.

FIG. 6 is a flow chart illustrating an exemplary method 600 for utilizing radial distortion to estimate a pose configuration according to an embodiment of the subject matter described herein. In some embodiments, method 600 may include an algorithm that is stored in memory and executed by a processor of a pose-tracking device (e.g., a pose-tracking device 102 as shown in FIG. 1). In block 602, an input pixel row of a radially distorted image is received from each of a plurality of camera devices. In some embodiments, a pose-tracking device is configured to receive an input pixel row from two or more rolling shutter camera devices. The pose-tracking device may be configured to process the input pixel row data in a real time basis or alternatively store the row data in memory for subsequent processing.

In block 604, a row comparison between each of the input pixel rows and a respectively associated synthesized pixel row is conducted. For example, in some embodiments the tracking engine can be configured to generate (for each of the received input pixel rows) a curve in an undistorted image space based on the undistorting of the input pixel row. Notably, this curve may be generated using a mathematical model with or without actually undistorting the radially distorted image. In some embodiments, a tracking engine executed by the pose-tracking device can generate the curve by executing a number of steps. For example, the tracking engine can synthesize an associated distorted row based on previous row and/or frame data. Further, the tracking engine can then utilize homography-based warp techniques to generate the synthesized distorted row. The tracking engine can then execute a mathematical comparison of the synthesized row and the distorted current row received from the rolling shutter camera devices. For example, the tracking engine may compare the two rows at multiple points that conceptually correspond to the centers of small line segments approximating the curve in the undistorted image space. In some embodiments, the generating and/or synthesizing of the curve by the tracking engine may be an optional step. Notably, the tracking engine can be configured to incorporate the underlying curve data in the computation such that the generation of the undistorted pixel row is not needed.

In block 606, for each row comparison, a span of a curve in an image space is approximated with a plurality of segments (e.g., line segments or curved line segments). As an example, the tracking engine may be configured to approximate a span of each generated curve in the undistorted image space using a plurality of segments. In some embodiments, the tracking engine uses the line segments or curved line segments in block 604 to mathematically yield the span of a curve (for each of the input pixel rows). In some alternate embodiments, the row comparison performed by the tracking engine comprises a mathematical correction for the distortion. As mentioned above, the tracking engine can apply the undistortion process to the linearly indexed coordinates (x',row) of the pixels to obtain the "true" undistorted coordinates of the pixel (x,y). Notably, the undistortion algorithm for processing the pixel coordinates can also be used for undistorting a distorted pixel row, but the image itself is notably never undistorted nor is an undistorted row ever generated or synthesized in memory.

In block 608, a constraint for each of the plurality of segments is computed. In some embodiments, the tracking engine determines remember of constraints for a single input pixel row. The total number of constraints that are computed by the tracking engine is determined by the product of the number of camera devices (N) and the number of constraints per row (C).

In block 610, the constraints are utilized to produce a pose configuration estimation. In some embodiments, the tracking engine is configured to collect all the constraints computed in block 608 and approximate the configuration (e.g., position and rotation) of the camera cluster (e.g., head-mounted display device) pose and/or head pose position.

Figure 7:
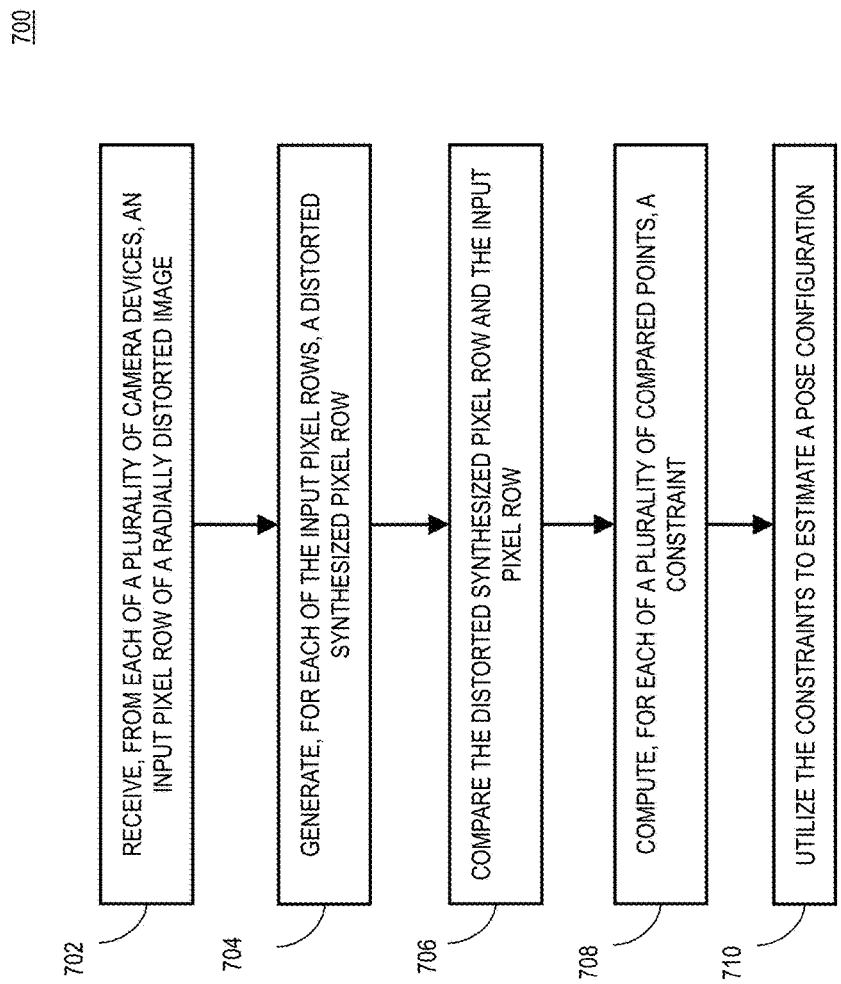
FIG. 7 is a flow chart illustrating another exemplary process for utilizing radial distortion to estimate a pose configuration according to an embodiment of the subject matter described herein.

FIG. 7 is a flow chart illustrating a second exemplary method 700 for utilizing radial distortion to estimate a pose configuration according to an embodiment of the subject matter described herein. In some embodiments, method 700 may include an algorithm that is stored in memory and executed by a processor of a pose-tracking device (e.g., a pose-tracking device 102 as shown in FIG. 1). In block 702, an input pixel row of a radially distorted image is received from each of a plurality of camera devices. In some embodiments, a pose-tracking device is configured to receive an input pixel row from two or more rolling shutter camera devices. The pose-tracking device may be configured to process the input pixel row data in a real time basis or alternatively store the row data in memory for subsequent processing.

In block 704, a distorted synthesized pixel row is generated. In some embodiments, the tracking engine can synthesize a distorted row (that corresponds to the received distorted input pixel row) based on previous row and/or frame data using homography-based warp techniques.

In block 706, the distorted synthesized pixel row and the input pixel row are compared. In some embodiments, the tracking engine is configured to compare the distorted pixel row generated in block 704 with the input pixel row of the radially distorted image received in block 702 at multiple corresponding pixel points. For example, the tracking engine can then execute a mathematical comparison of the distorted synthesized row and the distorted current row received from the rolling shutter camera devices. In some alternate embodiments, the tracking engine can be configured to incorporate the underlying curve data in the computation such that the generation of the undistorted pixel row is not needed. For example, the row comparison performed by the tracking engine can comprise a mathematical correction for the distortion. As mentioned above, the tracking engine can apply the undistortion process to the linearly indexed coordinates (x',row) of the pixels to obtain the "true" undistorted coordinates of the pixel (x,y). Notably, the undistortion algorithm for processing the pixel coordinates can also be used for undistorting a distorted pixel row, but the image itself is notably never undistorted nor is an undistorted row ever generated or synthesized in memory.

In block 708, a constraint for each of the plurality of compared points is computed. In some embodiments, the tracking engine determines remember of constraints for a single input pixel row. The total number of constraints that are computed by the tracking engine is determined by the product of the number of camera devices (N) and the number of constraints per row (C).

In block 710, the constraints are utilized to produce a pose configuration estimation. In some embodiments, the tracking engine is configured to collect all the constraints computed in block 708 and approximate the configuration (e.g., position and rotation) of the camera cluster (e.g., head-mounted display device) pose and/or head pose position.

It should be noted that each of the pose-tracking device, tracking engine, and/or functionality described herein may constitute a special-purpose computing device. Further, the pose-tracking device, tracking engine, and/or functionality described herein can improve the technological field of multi-camera tracking by leveraging the full breath of original image information that comprises radial distortion and thereby enabling tracking with fewer cameras. More specifically, the disclosed system and/or pose-tracking device obviates the need for performing any rectification and undistortion of images to make the input images more amenable for performing camera tracking. As such, the disclosed pose-tracking device affords the technical advantage by promptly estimating a head pose position much more efficiently and with fewer camera devices.

Experimentation

The disclosed tracking engine has been subjected to experiments using synthetic and real world imagery. For the synthetic experiments, a simulator was created using OpenGL and Qt that is capable of rendering images to simulate rolling shutter capture under radial distortion. For the real data experiment, tracking information is used from a 2000 Hz tracking system called Hi-Ball as ground truth. This system includes a low-latency wide-area tracking system operating with absolute errors of less than 0.03° and 0.5 mm.

The metric used for evaluating the approach is the rendering pixel error, i.e., the tracking-based error in the rendering of the virtual scene in a VR headset, as demonstrated by the system disclosed in Bapat et al. This is important in AR/VR applications since the rendering pixel errors directly affect the user experience. For this metric, the rendering pixel error is estimated for a point 1 m in front of the user for a resolution of 1080×1200 per eye which is widely used by standalone headgears like the HTC Vive, Oculus Rift, and Razer OSVR HDK2. RMS errors of the tracking with respect to the ground truth provided by the Hi-Ball is also presented. Results are compared to the system disclosed in Bapat et al. using synthetic imagery, as it is easy to capture images of the same room along the same motion track using a simulator. The tracking results of the approach are compared against other rolling-shutter-aware SLAM method(s) by capturing real imagery using the disclosed system's custom camera cluster.

Synthetic Data

Experiments using synthetic data, which was captured with camera parameters designed to be similar to real camera devices, are now presented. To compare directly with the system described in Bapat et al., all of the cluster cameras have the same vertical FoV of 60°, and the images were rendered at a 120 Hz frame rate with a resolution of 480×640, making the tracking frequency 57.6 kHz. The disclosed system used radial distortion parameters $k_1=-0.27$ and $k_2=0.11$ to reflect real cameras. Real human motion data captured with the Hi-Ball was used to render this synthetic imagery. As the Hi-Ball tracking frequency does not match the disclosed system's tracking frequency, the tracking frequency was interpolated to match the estimated frequency of 57.6 kHz. A textured 3D room model captured using a handheld Kinect RGB-D sensor was rendered to provide a realistic surrounding environment when simulating this motion.

The 6-camera case is accurate for real motions (see Table 800 in FIG. 8), while the 4-camera case shows more errors in tracking estimates, as it is inherently more sensitive to noise in pixel shifts. The 20-camera system of the system described in Bapat et al. ([5]) estimates pose from a single point in a row, and hence is not robust. Comparing the two, the disclosed system leverages multiple points in each row for pose estimation and employs robust filters, leading to a 2.55 px RMS error for the 4-camera case, even given the five-fold decrease in the number of cameras.

Real Data

A rig of six rolling shutter cameras mounted on top of a headgear (e.g., head-mounted display device) was constructed. All of the cameras were GoPro Hero3+ silver edition and were kept at a narrow FoV, capturing at 720× 1280 resolution at 120 Hz. The line delay for each camera was calibrated using a checkerboard pattern. The overlap in the cameras helped calibrate adjacent cameras in pairs. All cameras were synchronized in time using a blinking LED.

Experiments using real captured data at 120 Hz amounting to 86.4 kHz tracking frequency are now presented. Notably, the disclosed tracking engine is able to conduct tracking that is orders-of-magnitude faster than the current commercial trackers for a fraction of the cost. The disclosed tracking engine supports high-frequency tracking using the 4-camera cluster and 6-camera cluster configurations. With the 6-camera setup, less smoothing is required, as the linear system has more redundant constraints as compared to a 4-camera setup. The rendering pixel errors incurred for the disclosed system's approach are generally around one pixel and increase to 3 pixels as the tracking drifts with some outlier spikes in errors.

Compared to the system described in Bapat et al., the disclosed tracking engine is able to track for much longer, estimating poses for more than twice the row-samples while still maintaining accuracy. If similar-track-length tracking estimates are compared to the system described in Bapat et al, the disclosed tracking engine incurred only 1-pixel errors for real imagery. Table 800 in FIG. 8 shows the RMS error for translation, rotation, and rendering pixel error. For real imagery, the 4-camera case and 6-camera cases performed equally well, incurring 0.68 px and 0.75 px rendering error, respectively.

Each of the following references is incorporated herein by reference in its entirety:

[1] O. Ait-Aider, N. Andreff, J.-M. Lavest, and P. Martinet. Exploiting rolling shutter distortions for simultaneous object pose and velocity computation using a single view. In *Computer Vision Systems, 2006 ICVS'06. IEEE International Conference on*, pages 35-35. IEEE, 2006.

[2] O. Ait-Aider, A. Bartoli, and N. Andreff. Kinematics from lines in a single rolling shutter image. In *Computer Vision and Pattern Recognition, 2007. CVPR'07. IEEE Conference on*, pages 1-6. IEEE, 2007.

[3] C. Albl, Z. Kukelova, and T. Pajdla. R6p-rolling shutter absolute camera pose. In *Proceedings of the IEEE Conference on Computer Vision and Pattern Recognition*, pages 2292-2300, 2015.

[4] C. Albl, A. Sugimoto, and T. Pajdla. Degeneracies in rolling shutter sfm. In *European Conference on Computer Vision*, pages 36-51. Springer, 2016.

[5] A. Bapat, E. Dunn, and J.-M. Frahm. Towards kilo-hertz 6-dof visual tracking using an egocentric cluster of rolling shutter cameras. *IEEE Transactions on Visualization and Computer Graphics*, 22(11):2358-2367, 2016.

[6] D. A. Belsley, E. Kuh, and R. E. Welsch. *Regression diagnostics: Identifying influential data and sources of collinearity*, volume 571. John Wiley & Sons, 2005.

[7] D. Bradley, B. Atcheson, I. Ihrke, and W. Heidrich. Synchronization and rolling shutter compensation for consumer video camera arrays. In *Computer Vision and Pattern Recognition Workshops, 2009. CVPRWorkshops 2009. IEEE Computer Society Conference on*, pages 1-8. IEEE, 2009.

[8] D. C. Brown. Decentering distortion of lenses. *Photometric Engineering*, 32(3):444-462, 1966.

[9] Y. Dai, H. Li, and L. Kneip. Rolling shutter camera relative pose: Generalized epipolar geometry. In *The IEEE Conference on Computer Vision and Pattern Recognition (CVPR)*, June 2016.

[10] M. Dou, L. Guan, J.-M. Frahm, and H. Fuchs. Exploring high-level plane primitives for indoor 3d reconstruction with a hand-held rgb-d camera. In *Asian Conference on Computer Vision*, pages 94-108. Springer, 2012.

[11] J. Engel and Schöps. LSD-SLAM, General Notes on Good Results. https://github.com/tum-vision/lsd_slam#316-general-notes-for-good-results, 2014. [Online; accessed 12 Nov. 2017].

[12] J. Engel, T. Schöps, and D. Cremers. Lsd-slam: Large-scale direct monocular slam. In *European Conference on Computer Vision*, pages 834-849. Springer, 2014.

[13] P.-E. Forssén and E. Ringaby. Rectifying rolling shutter video from hand-held devices. In *Computer Vision and Pattern Recognition (CVPR), 2010 IEEE Conference on*, pages 507-514. IEEE, 2010.

[14] S. Gelper, R. Fried, and C. Croux. Robust forecasting with exponential and holt-winters smoothing. *Journal of forecasting*, 29(3):285-300, 2010.

[15] C. Geyer, M. Meingast, and S. Sastry. Geometric models of rolling-shutter cameras.

[16] M. Grundmann, V. Kwatra, D. Castro, and I. Essa. Effective calibration free rolling shutter removal. 2012.

[17] A. Handa, R. A. Newcombe, A. Angeli, and A. J. Davison. Real-time camera tracking: When is high framerate best? In *European Conference on Computer Vision*, pages 222-235. Springer, 2012.

[18] J. Hedborg, P.-E. Forssén, M. Felsberg, and E. Ringaby. Rolling shutter bundle adjustment. In *Computer Vision and Pattern Recognition (CVPR), 2012 IEEE Conference on*, pages 1434-1441. IEEE, 2012.

[19] J. Hedborg, E. Ringaby, P.-E. Forssén, and M. Felsberg. Structure and motion estimation from rolling shutter video. In *Computer Vision Workshops (ICCV Workshops), 2011 IEEE International Conference on*, pages 17-23. IEEE, 2011.

[20] C. Kerl, J. Stuckler, and D. Cremers. Dense continuous-time tracking and mapping with rolling shutter rgb-d cameras. *In Proceedings of the IEEE International Conference on Computer Vision*, pages 2264-2272, 2015.

[21] J.-H. Kim, C. Cadena, and I. Reid. Direct semi-dense slam for rolling shutter cameras. 2016.

[22] J.-H. Kim, Y. Latif, and I. Reid. Rrd-slam: Radial-distorted rolling-shutter direct slam. In *Robotics and Automation (ICRA), 2017 IEEE International Conference on*, pages 5148-5154. IEEE, 2017.

[23] S. M. LaValle, A. Yershova, M. Katsev, and M. Antonov. Head tracking for the oculus rift. *In Robotics* and Automation (ICRA), 2014 IEEE International Conference on, pages 187-194. IEEE, 2014.

[24] P. Lincoln, A. Blate, M. Singh, T. Whitted, A. State, A. Lastra, and H. Fuchs. From motion to photons in 80 microseconds: Towards minimal latency for virtual and augmented reality. *IEEE Transactions on Visualization and Computer Graphics,* 22(4):1367-1376, 2016.

[25] F. Liu, M. Gleicher, J. Wang, H. Jin, and A. Agarwala. Subspace video stabilization. *ACM Transactions on Graphics (TOG),* 30(1):4, 2011.

[26] L. Magerand, A. Bartoli, O. Ait-Aider, and D. Pizarro. Global optimization of object pose and motion from a single rolling shutter image with automatic 2d-3d matching. In *European Conference on Computer Vision,* pages 456-469. Springer, 2012.

[27] L. Oth, P. Furgale, L. Kneip, and R. Siegwart. Rolling shutter camera calibration. In *Proceedings of the IEEE Conference on Computer Vision and Pattern Recognition,* pages 1360-1367, 2013.

[28] A. Patron-Perez, S. Lovegrove, and G. Sibley. A splinebased trajectory representation for sensor fusion and rolling shutter cameras. *International Journal of Computer Vision,* 113(3):208-219, 2015.

[29] V. Rengarajan, A. N. Rajagopalan, and R. Aravind. From bows to arrows: Rolling shutter rectification of urban scenes. In *Proceedings of the IEEE Conference on Computer Vision and Pattern Recognition,* pages 2773-2781, 2016.

[30] M. V. Sanchez-Vives and M. Slater. From presence towards consciousness. In *8th Annual Conference for the Scientific Study of Consciousness,* 2004.

[31] O. Saurer, K. Koser, J.-Y. Bouguet, and M. Pollefeys. Rolling shutter stereo. In *Proceedings of the IEEE Intl. Conference on Computer Vision,* pages 465-472, 2013.

[32] O. Saurer, M. Pollefeys, and G. H. Lee. A minimal solution to the rolling shutter pose estimation problem. In *Intelligent Robots and Systems (IROS),* 2015 *IEEE/RSJ International Conference on,* pages 1328-1334. IEEE, 2015.

[33] O. Saurer, M. Pollefeys, and G. H. Lee. Sparse to dense 3d reconstruction from rolling shutter images. In *IEEE Computer Vision and Pattern Recognition.* IEEE, 2016.

[34] R. Y. Tsai and R. K. Lenz. A new technique for fully autonomous and efficient 3d robotics hand/eye calibration. *IEEE Transactions on robotics and automation,* 5(3):345-358, 1989.

[35] G. Welch, G. Bishop, L. Vicci, S. Brumback, K. Keller, et al. The hiball tracker: High-performance wide-area tracking for virtual and augmented environments. In *Proceedings of the ACM symposium on Virtual reality software and technology,* pages 1-ff. ACM, 1999.

[36] Z. Zhang. A flexible new technique for camera calibration. *IEEE Transactions on pattern analysis and machine intelligence,* 22(11):1330-1334, 2000.

[37] F. Zheng, T. Whitted, A. Lastra, P. Lincoln, A. State, A. Maimone, and H. Fuchs. Minimizing latency for augmented reality displays: Frames considered harmful. In *International Symposium on Mixed and Augmented Reality (ISMAR),* pages 195-200, 2014.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for utilizing radial distortion to estimate a pose configuration, the method comprising:
   receiving, from each of a plurality of camera devices, an input pixel row of a radially distorted image;
   conducting a row comparison between each of the input pixel rows and a respectively associated synthesized pixel row;
   approximating, for each row comparison, a span of a curve in an image space with a plurality of segments;
   computing, for each of the plurality of segments, a constraint; and
   utilizing the constraints to estimate a pose configuration.

2. The method of claim 1 wherein the plurality of camera devices includes a plurality of rolling shutter cameras.

3. The method of claim 1 wherein conducting the row comparison comprises generating the curve by synthesizing a distorted pixel row from previously captured frames of the radially distorted image using a homography-based warping technique.

4. The method of claim 3 comprising comparing the synthesized distorted pixel row with the input pixel row at multiple points that correspond to the centers of the plurality of segments.

5. The method of claim 3 wherein synthesizing a distorted pixel row includes extracting a distorted pixel row from the previously captured frames.

6. The method of claim 1 comprising storing data corresponding to each of the input pixel row and subsequently computing the constraints.

7. The method of claim 1 wherein the plurality of camera devices is configured as a camera cluster positioned on a head-mounted display.

8. A system utilizing radial distortion to estimate a pose configuration, the system comprising:
   a plurality of camera devices; and
   a pose-tracking device including at least one processor and a memory, wherein a tracking engine is stored in the memory and when executed by the at least one processor is configured for receiving an input pixel row of a radially distorted image from each of a plurality of camera devices, conducting a row comparison between each of the input pixel rows and a respectively associated synthesized pixel row, approximating, for each row comparison, a span of a curve in an image space with a plurality of segments, computing, for each of the plurality of segments, a constraint, and utilizing the constraints to estimate a pose configuration.

9. The system of claim 8 wherein the plurality of camera devices includes a plurality of rolling shutter cameras.

10. The system of claim 8 wherein the pose-tracking device is further configured for generating the curve by synthesizing a distorted pixel row from previously captured frames of the radially distorted image using a homography-based warping technique.

11. The system of claim 10 wherein the pose-tracking device is further configured for comparing the synthesized distorted pixel row with the input pixel row at multiple points that correspond to the centers of the plurality of segments.

12. The system of claim 10 wherein the pose-tracking device is further configured for extracting a distorted pixel row from the previously captured frames.

13. The system of claim 8 wherein the pose-tracking device is further configured for storing data corresponding to each of the input pixel row and subsequently computing the constraints.

14. The system of claim 8 wherein the plurality of camera devices is configured as a camera cluster positioned on a head-mounted display.

15. A non-transitory computer-readable medium having stored thereon executable instructions that when executed by a processor of a computer control the computer to perform steps comprising:
receiving, from each of a plurality of camera devices, an input pixel row of a radially distorted image;
conducting a row comparison between each of the input pixel rows and a respectively associated synthesized pixel row;
approximating, for each row comparison, a span of a curve in an image space with a plurality of line segments;
computing, for each of the plurality of segments, a constraint; and
utilizing the constraints to estimate a pose configuration.

16. The non-transitory computer-readable medium of claim 15 wherein the plurality of camera devices includes a plurality of rolling shutter cameras.

17. The non-transitory computer-readable medium of claim 15 wherein conducting a row comparison comprises generating the curve by synthesizing a distorted pixel row from previously captured frames of the radially distorted image using a homography-based warping technique.

18. The non-transitory computer-readable medium of claim 17 comprising comparing the synthesized distorted pixel row with the input pixel row at multiple points that correspond to the centers of the plurality of segments.

19. The non-transitory computer-readable medium of claim 17 wherein synthesizing a distorted pixel row includes extracting a distorted pixel row from the previously captured frames.

20. The non-transitory computer-readable medium of claim 17 comprising storing data corresponding to each of the input pixel row and subsequently computing the constraints.

* * * * *